Fig.1

Feb. 4, 1958  W. GROSSE  2,821,909
TYPE CONTROL APPARATUS FOR BUSINESS
MACHINES AND THE LIKE
Filed April 7, 1955  6 Sheets—Sheet 4

Fig. 4

Inventor
Willy Grosse
by:
Michael S. Striker
agt.

ns united States Patent Office 2,821,909
Patented Feb. 4, 1958

2,821,909

TYPE CONTROL APPARATUS FOR BUSINESS MACHINES AND THE LIKE

Willy Grosse, Oberndorf, Germany, assignor to Olympia Werke Aktiengesellschaft, Wilhelmshaven, Germany, a joint-stock company Application April 7, 1955, Serial No. 499,962

11 Claims. (Cl. 101—93)

The present invention relates to business machines. More particularly the present invention relates to business machines which are adapted to type certain symbols on a strip of paper or the like. These symbols may be, for example, a date.

With known business machines of this type, the apparatus which controls the typing of preselected symbols is exceedingly complicated and requires a considerable amount of space. For example, in these known constructions there may be a motion transmitting member which moves the type-carrying member to a preselected position, and this motion transmitting member is provided with a number of stops usually greater than the number of symbols carried by the type-carrying member so that this motion transmitter is quite large and requires a large space. A limiting member is provided in such known machines for limiting the movement of the motion transmitting member so as to properly locate the latter, and this limiting means is provided with some sort of catch mechanism such as a pawl and ratchet device for properly engaging the motion transmitting member, all of which makes the known constructions quite elaborate and expensive.

One of the objects of the present invention is to overcome the above drawbacks by providing an exceedingly simple control apparatus for locating a type-carrying member in a preselected position.

Another object of the present invention is to provide a simple control apparatus of the above type which requires far less space than known control apparatus for accomplishing similar results.

A further object of the present invention is to provide a means for distributing the stops which control the location of the type-carrying member among both the means which moves the type-carrying member and the means which limits the movement of the means which moves the type-carrying member, so that neither one of these means is excessively large.

An additional object of the present invention is to provide an arrangement where no symbols on the type-carrying means are duplicated.

A still further object of the present invention is to provide a means for simultaneously controlling setting of a plurality of type-carrying members with a single manually operable adjusting structure.

With the above objects in view the present invention mainly consists of a business machine which includes a type-carrying means carrying a series of type symbols. A support means mounts the type-carrying means for movement to a plurality of settings at which the symbols are respectively in a typing position. A first adjusting means is operatively connected to the type-carrying means for moving the same to the settings thereof, respectively, this first adjusting means having a first abutment and a plurality of first stops corresponding to a first group of the symbols, respectively. The first adjusting means is mounted on the support means for movement in a predetermined direction which describes separate paths of movement for the first abutment and the first stops, respectively. A second adjusting means is located adjacent the first adjusting means and has a second abutment and a plurality of second stops corresponding to a second group of the symbols, respectively, and the second adjusting means is carried by the support means for movement to a first set of positions where the second abutment is respectively located in the path of movement of the first stops and to a second set of positions where the second stops are respectively located in the path of movement of the first abutment. A manually operable locating means engages the second adjusting means for locating the same in a selected one of the first and second sets of positions, and a moving means is operatively connected to the first adjusting means for moving the same from a rest position, where none of the symbols are in their typing position, in the above-mentioned predetermined direction to successively locate the series of symbols in the typing position, one of the stops of one of the adjusting means being engaged by the abutment of the other of the adjusting means to limit the movement of the first adjusting means by the moving means in accordance with the position in which the second adjusting means is located by the locating means so that in this way a selected one of the symbols is located in its typing position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
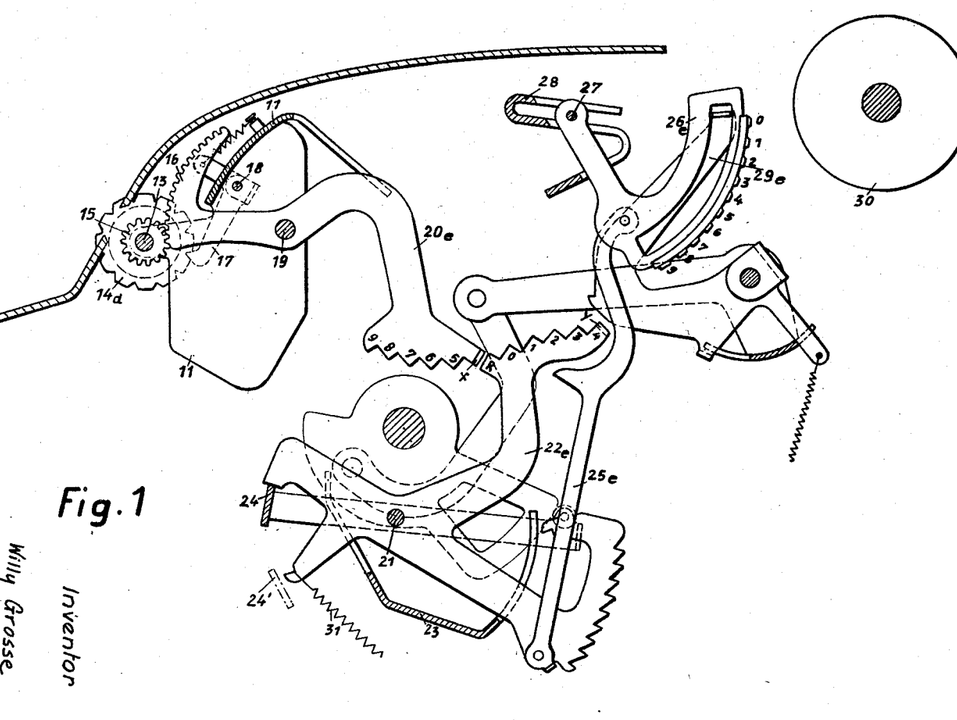
Fig. 1 is a partly sectional, fragmentary, partly schematic side elevational view of one possible embodiment of a control apparatus constructed in accordance with the present invention for controlling the location of a type-carrying member, the structure of Fig. 1 being shown in its rest position where no symbols will be typed.

Referring now to Fig. 1, it will be seen that a first adjusting means in the form of a plate 22e is mounted for movement in a predetermined direction on a support means which is formed by the frame of the machine and the shaft 21 which is fixed to this frame. Thus, the plate 22e is turnable about the shaft 21, and this plate is guided during its turning movement in a known way by the slots of a guide member 23 which is fixed to the frame of the machine. Thus, the plate 22e is located in a predetermined plane and turns in this plane. The plate 22e is pivotally connected to one end of a link 25e whose opposite end is pivotally connected to the type-carrying means 26e, the latter being guided in a slot of a stationary guide member 28 through the medium of a pin 27 fixed to the type-carrying member 26e and movable in the frame 28. As is well known, turning of the member 29e will move member 26e in a direction which causes one of the symbols thereon to be typed. The means for moving the type-carrying member 26e toward and away from the platen 30 for effecting the typing forms no part of the present invention and can be of any known construction.

As is apparent from Fig. 1, the adjusting means 22e is formed with a series of steps which form stops R and 0–4 the stop R corresponding to the rest position of the apparatus shown in Fig. 1, where no symbols will be typed, and the stops 0–4 respectively corresponding to the symbols 0–4 carried by the type-carrying means 26e. Furthermore, the top end of the plate 22e is provided with an abutment y in the form of a tongue bent laterally from the plate 22e and extending out of its plane.

A second adjusting means in the form of a plate 20e is carried on a support means formed by the frame of the machine and the stationary shaft 19 for turning movement about the shaft 19, and it will be noted that the shaft 19 is parallel to the shaft 21 so that the pair of adjusting means 22e and 20e are respectively turnable about parallel axes. As is apparent from Fig. 1, the plate 20e is formed with a series of stops which respectively correspond to the symbols 5–9 of the type-carrying member 26e, so that the symbols of the latter member are distributed between the two plates 22e and 20e. The plate 20e is additionally provided with an abutment x which is in the form of a tongue extending laterally out of the plane of plate 20e across the plane in which the plate 22e is located, the abutment y extending from plate 22e across the plane in which plate 20e is located. As is apparent from Fig. 2, the plates 20e and 22e are respectively located in parallel planes which are adjacent to but spaced slightly from each other, respectively, and Fig. 2 clearly shows how the abutment x extends across the plane of plate 22e while the abutment y extends across the plane of plate 20e.

The second adjusting means 20e has operatively connected thereto a manually operable means for locating this second adjusting means 20e in a predetermined angular position with respect to the shaft 19. This manually operable locating means takes the form of a gear sector 16 integral with plate 20e and meshing with a pinion 15 which is fixed to a wheel 14d turnably carried together with the pin 15 by a stationary shaft 13 fixed to the frame of the machine. Also, the plate 20e is guided during its turning movement in a slot formed in a stationary guide member 11, and a pawl 17 is mounted for turning movement on a shaft 18 carried by the guide member 11 and is urged by the spring shown in the upper left-hand portion of Fig. 1 into engagement with notches formed in the periphery of handwheel 14d so that the pawl 17 guarantees that the wheel 14d will be located in a predetermined one of a plurality of different positions.

As is apparent from Fig. 1, a bail 24 locates the plate 22e in the rest position shown in Fig. 1 where the abutment x is located opposite the stop R. This bail is manually operated through any known structure not forming part of the present invention to be moved to the dotted line position 24' when the type-carrying member 26e is to be set to a predetermined position. A spring 31 is connected to the plate 22e for turning the latter in a counterclockwise direction about the shaft 21 so as to move the type carrying member 26e through the link 25e from the rest position shown in Fig. 1 to an end position where, for example, the last of the series of symbols on the type-carrying member 26e is located in a typing position. Thus, when the machine is zeroed the bail 24 is moved to the solid line position shown in Fig. 1 in order to locate the plate 22e in the rest position against the action of spring 31.

It should be noted that the several stops and the abutment y of the plate 22e are turnable through separate circular paths upon turning of plate 22e about shaft 21. The turning of the handwheel 14d will locate the abutment x in one of a first set of positions where this abutment x is located in the path of movement of a preselected one of the steps of the plate 22e, so that when the bail 24 is in the dot-dash line position of Fig. 1 the spring 31 will turn the plate 22e until one of its stops engages the abutment x, and in this way the type member 26e will be located in a preselected position where one of the symbols 0–4 is located in a typing position. It will also be noted that the handwheel 14d may be turned to move the plate 20e beyond this first set of positions to a second set of positions where the stops 5–9 respectively are located in the path of movement of the abutment y. Thus, when the plate 20e is one of the second set of positions, the abutment y will engage one of the stops 5–9 to correspondingly locate the type-carrying member 26e in a position where one of the symbols 5–9 is set to be typed. In this way the stops are distributed between the two plates 20e and 22e and at the same time the position of plate 22e is properly determined for locating a predetermined one of the symbols 0–9 in a typing position. The position of Fig. 1 where the stop R is located opposite the abutment x corresponds to the rest or zero position of the apparatus where the handwheel 14d indicates that nothing will be typed.

Figure 2:
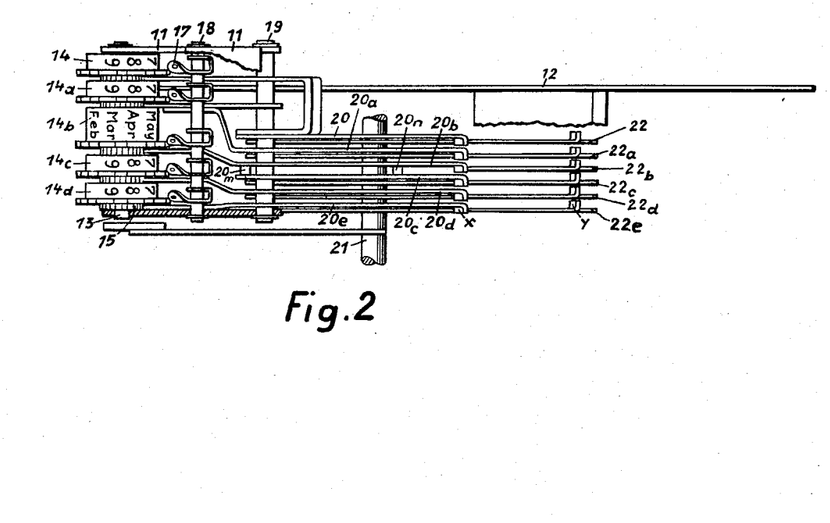
Fig. 2 is a fragmentary, partly schematic, top plan view of a series of the structures shown in Fig. 1, Fig. 2 showing the structure of the invention as applied to a means for typing a preselected date.

As is apparent from Fig. 2, the stationary guide 11, which is fixed to the frame wall 12, carries the shafts 13, 18, and 19. Handwheels 14—14d are freely turnable on the shaft 13 and carry indicia as shown in Fig. 2. Each of these handwheels has a pinion 15 fixed thereto, this pinion meshing with a gear sector 16 as shown in Fig. 1. In the illustrated example the indicia of wheels 14 and 14a is in the form of numerals 0–9 plus a pair of empty spaces and serve to set the days of the month (from 1 to 31) into the machine. The wheel 14b serves to set one of the 12 months of the year into the machine and has in addition an empty space corresponding to the zero or rest position of the apparatus, while the wheels 14c and 14d are each provided with the numerals 0–9 plus two empty spaces, these wheels 14c and 14d serving to set the year into the apparatus, in the particular example shown where the structure of the invention is applied to a means for setting a date into the machine. These handwheels 14—14d by rotation of the pinions 15 respectively fixed thereto turn the sectors 16, respectively, and in this way turn the several plates 20—20e about the shaft 19, the positions of these plates 20—20e correspond to the extent to which the plates 22—22e, respectively, will be free to turn under the influence of the springs 31 respectively connected to these plates. As is apparent from Fig. 2, each pair of plates 20 and 22, 20a and 22a, etc., are located in parallel planes and are provided with abutments as described above. Thus, with this arrangement it is possible for one of the plates 22—22e to partly overlap its corresponding plate 20—20e, respectively.

Figure 3:
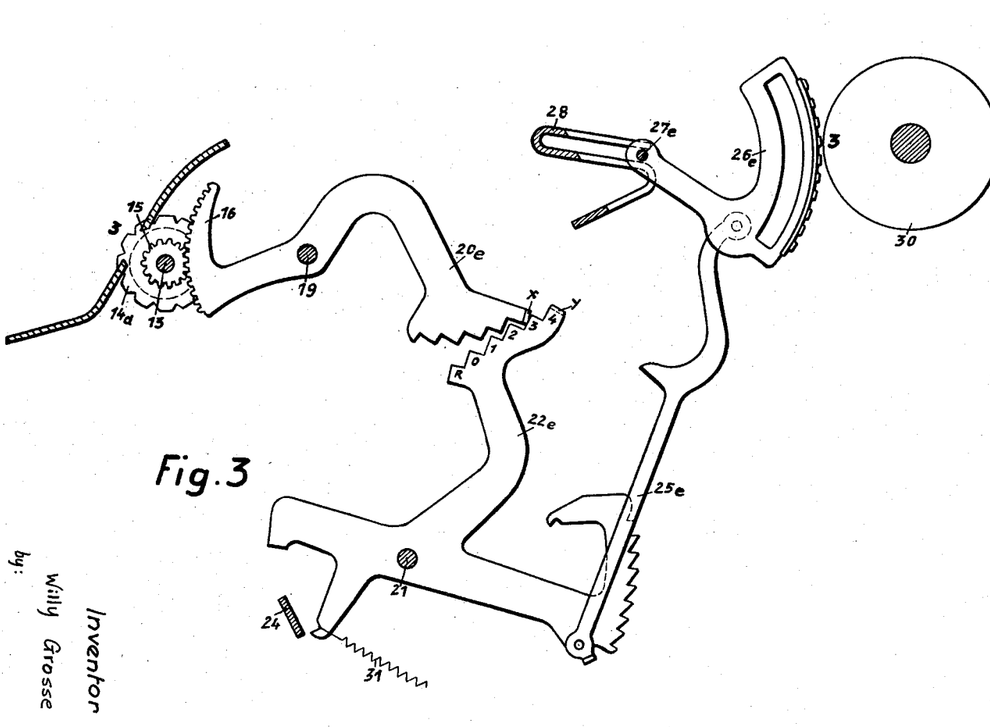
Fig. 3 shows part of the structure of Fig. 1 in a position where it is set to type a numeral 3.
Figure 4:
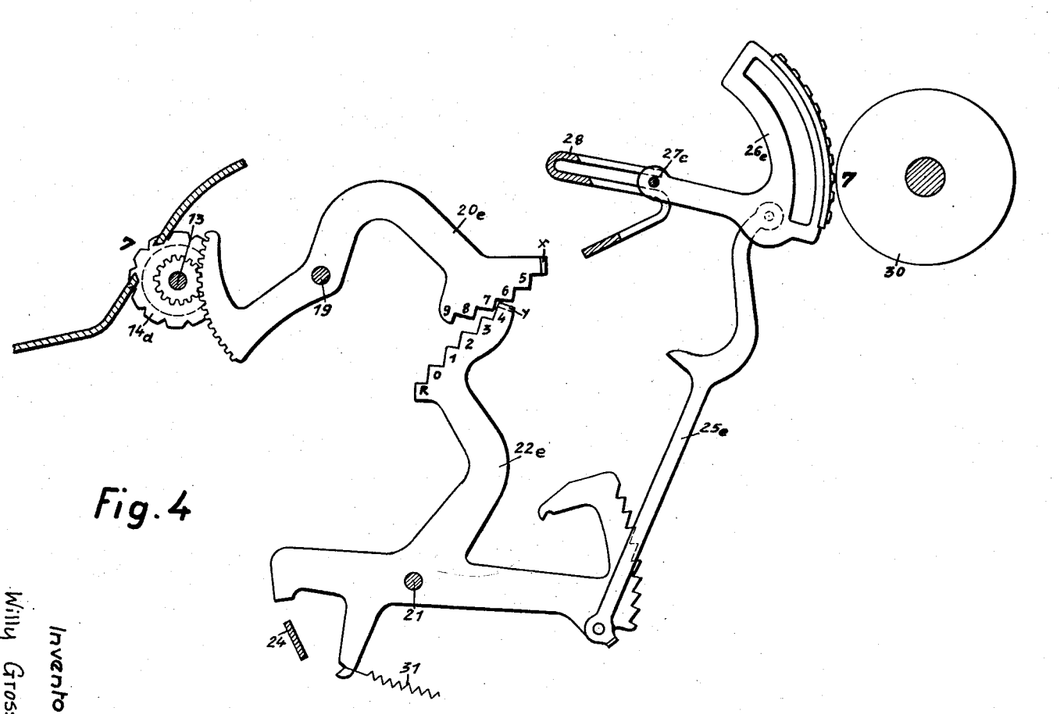
Fig. 4 is a view of the apparatus corresponding to Fig. 3 but showing the apparatus set to type a numeral 7.

Fig. 3 illustrates how the structure of Fig. 1, which shows the handwheel 14d and its associated plates 20e and 22e, assumes a position where the type-carrying member 26e is set to type a numeral 3. As is apparent from Fig. 3, the handwheel 14b has been turned to locate the abutment x of plate 20e along the path of turning movement of the stop 3 of plate 22e so that the turning movement of the latter plate under the influence of spring 31 is limited by engagement of abutment x and stop 3 to properly locate the symbol 3 of the type-carrying member of 26e in a typing position. Fig. 4 illustrates how this same structure is set to type a numeral 7. Thus, the handwheel 14d has been turned to the position where the numeral 7 appears in the window of the machine housing, and it will be noted that the plate 20e has been turned in a counterclockwise direction beyond the position of Fig. 3 to the second set of positions, mentioned above, where the stops 5–9 respectively extend across the path of turning movement of the abtument y, the structure being shown in Fig. 4 where the stop 7 has been located in this path so that in this way the plate 22e is free to turn under the influence of spring 31 until it moves the link 25e and the type-carrying member 26e therewith to a position where the symbol 7 will be typed.

Figure 5:
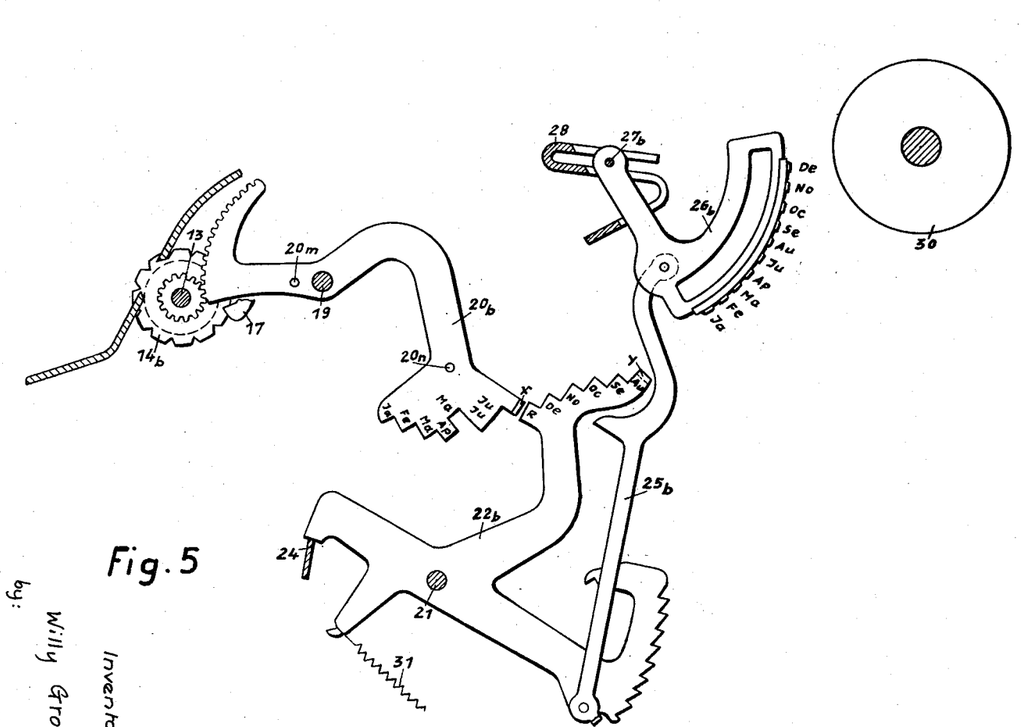
Fig. 5 is a view of the apparatus corresponding to Fig. 1 but showing that part of the apparatus which types the first syllable of the months of the year in the particular example shown in Fig. 5.

Fig. 5 shows the rest position of the apparatus associating with the handwheel 14b. In this position the type-carrying member 26b is in its lowermost position where no symbols thereof will be typed. Fig. 5 shows how the first pair of letters of each symbol on handwheel 14b is located on the type-carrying member 26b, and Fig. 5 furthermore shows how the stops of plates 20b and 22b are arranged to correspond to the symbols on the type-carrying member, in the manner described above. Thus, it will be noted that the stops for May and March as well as the stops for June and July are located the same radial distance from the shaft 19. Thus, if the handwheel 14b is set to place the month of March into the machine, then the abutment y will become located on the third stop from the left, as viewed in Fig. 5, and the type-carrying member 26b will be set to type "Ma." When the handwheel 14b is turned to place the month of May into the machine, the abutment y will engage the fifth stop from the left, as viewed in Fig. 5, and since the third and fifth stops from the left, as viewed in Fig. 5, are located at the same radial distance from shaft 19, the type-carrying member 26b will again be located in the position where it will type the same symbol "Ma." Thus, in this way it is unnecessary to repeat the same symbol on the type-carrying member, and therefore the latter may be provided with a number of symbols which is smaller than the number of stops. The above considerations with respect to the months of March and May obviously are equally applicable to the months of June and July, and it will be noted that Fig. 5 shows only one symbol "Ju" on the type-carrying member 26b.

Figure 6:
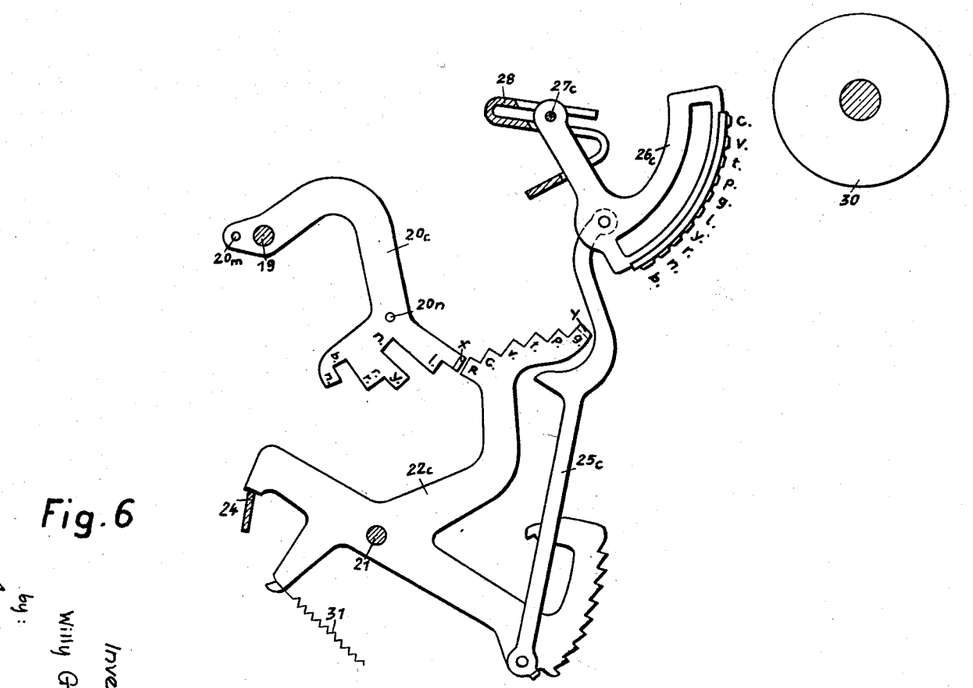
Fig. 6 illustrates structure associated with that of Fig. 5 for completing the typing of the symbols which are typed with the apparatus of Fig. 5.

Fig. 6 shows the structure which cooperates with the structure of Fig. 5 for completing the first syllables of the months of the year by adding a letter to the two letters of each symbol provided with the apparatus of Fig. 5. It will be seen from Fig. 6 that the plate 20c is not adjusted by any handwheel. It is instead connected, as by rivets extending through openings 20m and 20n, to the plate 20b for turning movement therewith about the shaft 19. Thus, when the handwheel 14b is turned to set a particular month of the year into the machine, the plate 20c will turn together with the plate 20b. For example, if the handwheel 14b is turned to set the month of January into the machine then the plate 20c will turn together with the plate 20b to a position where the abutment y of plate 22c of Fig. 6 will engage the leftmost stop of Fig. 6, and thus the type-carrying members 26b and 26c will be simultaneously actuated to type the letters "Jan," the character "n." being typed by the type-carrying member 26c of Fig. 6.

If the handwheel 14b is turned to set, for example, the month of June into the machine, then the abutment y of plate 22b (Fig. 5) will engage the stop "Ju" of plate 20b, and thus, the type-carrying member 26b will be in a position to type the symbol "Ju" at the same time the abutment y of plate 22c (Fig. 6) will engage the stop n which is located before the stop l on plate 20c. Since this latter stop n is located at the same radial distance from shaft 19 as the leftmost stop n of Fig. 6, the type-carrying means 26c will be set to type the same "n" which is typed with the month of January. Thus, Fig. 6 further demonstrates how it is unnecessary to duplicate symbols on the type-carrying member 26c, and furthermore it will be noted that the apparatus of Figs. 5 and 6 is controlled by the single handwheel 14b.

It is apparent that variations of the above described detailed construction are possible. For example, instead of indicating the months in countries whose language does not permit a combination of the above type to be provided, it is possible in accordance with the invention to provide Roman numerals to indicate the months of the year. Thus, for example, it is possible to provide structure similar to that of Figs. 5 and 6 for typing XII by combining X and II, or typing XI by combining X and I, or VII by combining V and II, or VI by combining V and I.

It is apparent that the above described adjusting means in the form of plates, provided with steps which form stops and also each provided with an abutment, may be combined with other structures for locating the plates 20—20e in a desired position and with other structures for transmitting the movement of plates 22—22e to type-carrying devices. Also, it is possible to provide stops at equal radial distances from the turning axis of the adjusting means on known adjusting members for the purpose of decreasing the number of symbols which must be carried by a type-carrying means.

It will be understood that each of the elements described above, or two or more together, may also find a useful application in other types of business machines differing from the types described above.

While the invention has been illustrated and described as embodied in means for controlling type-carrying members of business machines, it is not intended to be limited to the details shown, since various modifications and structural changes may be made without departing in any way from the spirit of the present invention.

What is claimed as new and desired to be secured by Letters Patent is:

1. In a business machine, in combination, type-carrying means carrying a series of type symbols; support means mounting said type-carrying means for movement to a plurality of settings at which said symbols are respectively in a typing position; first adjusting means operatively connected to said type-carrying means for moving the same to said settings, respectively, said first adjusting means having a first abutment and a plurality of first stops corresponding to a first group of said symbols, respectively; means mounting said first adjusting means on said support means for movement in a predetermined direction which describes separate paths of movement for said first abutment and said first stops, respectively; second adjusting means located adjacent said first adjusting means and having a second abutment and a plurality of second stops corresponding to a second group of said symbols, respectively; means mounting said second adjusting means on said support means for movement to a first set of positions where said second abutment is respectively located in said paths of movement of said first stops and to a second set of positions where said second stops are respectively located in said path of movement of said first abutment; manually operable locating means engaging said second adjusting means for locating the same in a selected one of said first and second sets of positions; and moving means operatively connected to said first adjusting means for moving the same from a rest position, where none of said symbols are in said typing position, in said predetermined direction to successively locate said series of symbols in said typing position, one of said stops of one of said adjusting means being engaged by the abutment of the other of said adjusting means to limit movement of said first adjusting means by said moving means in accordance with the position in which said second adjusting means is located by said locating means so as to set a selected one of said symbols in said typing position.

2. In a business machine, in combination, type-carrying means carrying a series of type symbols; support means mounting said type-carrying means for movement to a plurality of settings at which said symbols are respectively in a typing position; first adjusting means operatively connected to said type-carrying means for moving the same to said settings, respectively, said first adjusting means having a first abutment and a plurality of first stops corresponding to a first group of said symbols, respectively, and arranged in a series next to said first abutment; means mounting said first adjusting means on said support means for movement in a predetermined direction which describes separate paths of movement for said first abutment and said first stops, respectively; second adjusting means located adjacent said first adjusting means and having a second abutment and a plurality of second stops corresponding to a second group of said symbols, respectively, and arranged in a series next to said second abutment; means mounting said second adjusting means on said support means for movement to a first set of positions where said second abutment is respectively located in said paths of movement of said first stops and to a second set of positions where said second stops are respectively located in said path of movement of said first abutment; manually operable locating means engaging said second adjusting means for locating the same in a selected one of said first and second sets of positions; and moving means operatively connected to said first adjusting means for moving the same from a rest position, where none of said symbols are in said typing position, in said predetermined direction to successively locate said series of symbols in said typing position, one of said stops of one of said adjusting means being engaged by the abutment of the other of said adjusting means to limit movement of said first adjusting means by said moving means in accordance with the position in which said second adjusting means is located by said locating means so as to set a selected one of said symbols in said typing position.

3. In a business machine, in combination, type-carrying means carrying a series of type symbols; support means mounting said type-carrying means for movement to a plurality of settings at which said symbols are respectively located in a typing position; a first adjusting member operatively connected to said type-carrying means for moving the same to said settings, respectively, said first adjusting member having a first abutment and a plurality of first steps arranged in a series next to said first abutment and forming a plurality of first stops corresponding to a first group of said symbols, respectively; means mounting said first adjusting member on said support means for turning movement about a first axis to describe separate circular paths of movement for said first abutment and said first stops, respectively; a second adjusting member located adjacent said first adjusting member and having a second abutment and a plurality of second steps arranged in a series next to said second abutment to form a plurality of second stops corresponding to a second group of said symbols, respectively; means mounting said second adjusting member on said support means for turning movement about a second axis parallel to said first axis to a first set of positions where said second abutment is respectively located in said paths of movement of said first stops and to a second set of positions where said second stops are respectively located in said path of movement of said first abutment; manually operable locating means engaging said second adjusting member for locating the same in a selected one of said first and second sets of positions; and moving means operatively connected to said first adjusting member for moving the same from a rest position, where none of said symbols are in said typing position, in said predetermined direction to successively locate said series of symbols in said typing position, one of said stops of one of said adjusting members being engaged by the abutment of the other of said adjusting members to limit movement of said first adjusting member by said moving means in accordance with the position in which said second adjusting member is located by said locating means so as to set a selected one of said symbols in said typing position.

4. In a business machine, in combination, type-carrying means carrying a series of type symbols; support means mounting said type-carrying means for movement to a plurality of settings at which said symbols are respectively located in a typing position; a first adjusting plate operatively connected to said type-carrying means for moving the same to said settings, respectively, said first adjusting plate being located in a first plane and having a first abutment in the form of a tongue bent laterally from said first plate out of said first plane and said first plate having a plurality of first steps arranged in a series next to said first abutment, and forming a plurality of first stops corresponding to a first group of said symbols, respectively; means mounting said first plate on said support means for turning movement about a first axis located at different distances from said first abutment and first stops, respectively, so that said first abutment and stops respectively describe separate circular paths during turning of said first plate about said first axis; a second adjusting plate located adjacent said first adjusting plate in a second plane parallel to and spaced laterally from said first plane, said second plane extending across said first abutment and said second plate having a second abutment in the form of a tongue bent laterally from said second plate and extending across said first plane, and said second plate having a plurality of second steps arranged in a series next to said second abutment to form a plurality of second stops corresponding to a second group of said symbols, respectively; means mounting said second plate on said support for turning movement about a second axis parallel to said first axis to a first set of positions where said second abutment is respectively located in said paths of movement of said first stops and to a second set of positions where said second stops are respectively located in said path of movement of said first abutment; manually operable locating means engaging said second plate for locating the same in a selected one of said first and second sets of positions; and moving means operatively connected to said first plate for moving the same from a rest position, where none of said symbols are in said typing position, in said predetermined direction to successively locate said series of symbols in said typing position, one of said stops of one of said plates being engaged by the abutment of the other of said plates to limit movement of said first plate by said moving means in accordance with the position in which said second plate is located by said locating means so as to set a selected one of said symbols in said typing position.

5. In a business machine as defined in claim 1, said first stops plus said second stops being equal in number to the number of symbols.

6. In a business machine as defined in claim 3, one of said plates having a plurality of stops located at the same radial distance from its turning axis and all corresponding to a single one of said symbols so that said type-carrying member carries a number of symbols which is less than the total number of stops.

7. In a business machine as defined in claim 3, said manually operable locating means comprising a wheel turnably carried by said support means and adapted to be turned manually, a pinion fixed to said wheel for rotation therewith, and a gear sector meshing with said pinion and forming part of said second adjusting member.

8. In a business machine as defined in claim 1, said moving means comprising a spring means operatively connected to said first adjusting means for urging the latter from said rest position in said predetermined direction and releasable stop means engaging said first adjusting means for releasably holding the latter in said rest position thereof against the action of said spring means.

9. In a business machine as defined in claim 1, a second type-carrying means located next to the first-mentioned type-carrying means and carrying second symbols for respectively completing symbols carried by the first type-carrying means, said second type-carrying means being carried by said support means for movement to a plurality of settings at which said second symbols are respectively in a typing position; third adjusting means operatively connected to said second type-carrying means for moving the same to said settings thereof, respectively, said third adjusting means having a third abutment and a plurality of third stops corresponding to a first group of symbols of said second type-carrying means respectively; means mounting said third adjusting means on said support means for movement in a predetermined direction which describes separate paths of movement for said third abutment and said third stops, respectively; fourth adjusting means fixed to said second adjusting means for movement therewith and being located adjacent said third adjusting means, said fourth adjusting means having a fourth abutment and a plurality of fourth stops corresponding to a second group of symbols of said second type-carrying means, respectively, said fourth adjusting means being movable with said second adjusting means to a first set of positions where said fourth abutment is respectively located in the paths of movement of said third stops and to a second set of positions where said fourth stops are respectively located in the path of movement of said third abutment, whereby said second type-carrying means is set together with said first-mentioned type-carrying means upon actuation of said locating means and moving means.

10. In a business machine as defined in claim 9, said first and third adjusting means being carried by said support means for a turning movement about a first axis and said second and fourth adjusting means being carried by said support means for turning movement about a second axis parallel to said first axis, a plurality of stops of said fourth adjusting means being located at the same radial distance from said second axis and each corresponding to one of said symbols of said second type-carrying means, so that the latter has a number of symbols smaller than the total number of stops on said third and fourth adjusting means.

11. In a business machine as defined in claim 1, the number of stops of said first adjusting means being equal to the number of stops of said second adjusting means.

References Cited in the file of this patent

UNITED STATES PATENTS

| | | |
|---|---|---|
| 1,730,147 | Horton | Oct. 1, 1929 |
| 1,768,526 | Lasker | June 24, 1930 |
| 1,874,700 | Gardner | Aug. 30, 1932 |
| 2,076,717 | Fuller | Apr. 13, 1937 |
| 2,076,740 | Mills | Apr. 13, 1937 |
| 2,291,970 | Neumann | Aug. 4, 1942 |
| 2,307,669 | Crosman | Jan. 5, 1943 |